United States Patent [19]

Broer et al.

[11] Patent Number: 5,024,850
[45] Date of Patent: Jun. 18, 1991

[54] METHOD OF MANUFACTURING A POLARIZATION FILTER AND A POLARIZATION FILTER SO OBTAINED

[75] Inventors: Dirk J. Broer; Jan Van Der Veen, both of Eindhoven, Netherlands

[73] Assignee: U.S. Philips Corporation, New York, N.Y.

[21] Appl. No.: 446,845

[22] Filed: Dec. 6, 1989

[30] Foreign Application Priority Data

May 10, 1989 [NL] Netherlands .......................... 8901167

[51] Int. Cl.$^5$ ............................................ C09K 19/00
[52] U.S. Cl. ........................................... 428/1; 427/47; 427/54.1; 427/163; 427/164; 428/411.1; 428/435; 428/473.5; 428/910; 428/913
[58] Field of Search ................. 427/47, 54.1, 163, 164; 428/1, 411.1, 435, 473.5, 910, 913

Primary Examiner—Bernard Pianalto
Attorney, Agent, or Firm—Norman N. Spain

[57] ABSTRACT

A method of manufacturing a polarization filter, in which a mixture of a liquid crystalline diacrylate monomer or dimethacrylate monomer and a dichroic colorant is provided on a substrate, oriented and polymerized by exposing it to radiation, as well as a polarization filter which is manufactured according to the above method, and a display comprising the polarization filter.

5 Claims, 1 Drawing Sheet

METHOD OF MANUFACTURING A POLARIZATION FILTER AND A POLARIZATION FILTER SO OBTAINED

BACKGROUND OF THE INVENTION (a) Technical Field

Polarization filters for use in optical systems and in particular in liquid crystalline displays.

(b) State of the Art

In Japanese Patent Application No. 62-70407, a method of producing a uniaxially oriented optically transparent film is described. Firstly, the surface of a support plate is oriented. A mixture comprising at least two liquid crystalline monomers and a photo polymerization initiator is provided on said plate. The monomers have a functional, polymerizable group in the molecule. The monomers used correspond to the formula $$CH_2=C-C-O-(CH_2)_4-O-X,$$
$$\phantom{CH_2=}|\phantom{-}\|$$
$$\phantom{CH_2=}R\phantom{-}O$$

wherein R is a hydrogen atom or a methyl group and X is a group of the formula

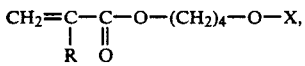

or of the formula

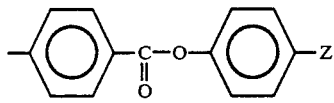

wherein Z is —CN or —F.

The mixture may comprise a dichroic colorant, a UV absorber and a spacer such as glass grains. Subsequently, the monomers are polymerized in the liquid crystalline state by exposing them to radiation using UV light or visible light.

(c) Problems to be Solved

The oriented film described hereinabove under (b) has the disadvantage that the orientation is completely lost when the temperature is increased to a level above the transition temperature nematic-isotropic. Consequently, the film is not temperature resistant, not even when the film is heated for a short period, for example, during the production process.

SUMMARY OF THE INVENTION

The problem described under (c) is solved by the invention which provides the following method:

A method of manufacturing a polarization filter, in which a mixture of a liquid crystalline monomer and a dichroic colorant is oriented on a substrate, and the monomer is polymerized by exposing it to uniform radiation, characterized in that a monomer is used which corresponds to the formula

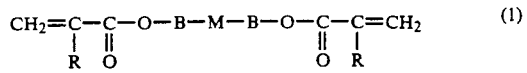

wherein

B is a bridging group,

R is a hydrogen atom or a methyl group, and

M is a mesogenic group comprising at least a phenyl group and/or a cyclohexyl group so that the monomer as a whole acquires a nematic or smectic phase.

The polarization filter obtained according to the invention comprises an oriented layer having an ordered network of a polymerised and oriented monomer in which the dichroic colorant which is dissolved or finely dispersed therein is oriented also. The polarisation filter manufactured according to the invention is thermostable. The orientation is preserved even when it is heated to very high temperatures of, for example, 350° C.

DETAILED DESCRIPTION OF THE INVENTION

Figure 1:
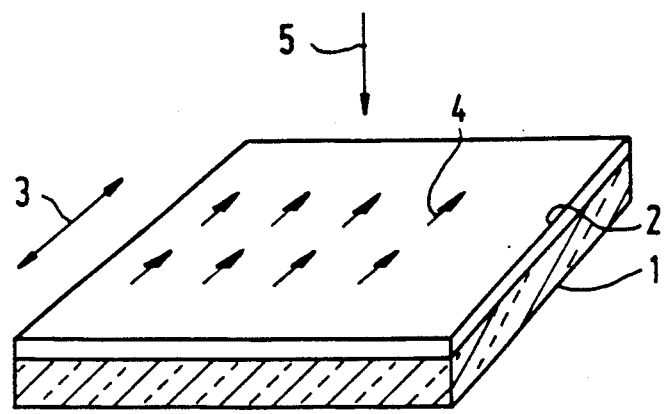
FIG. 1 is a perspective top view of a polarization filter manufactured according to the invention.

The bridging group B shown in formula 1 is, for example, a group which can be represented by one of the following formulae:

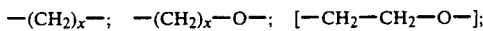
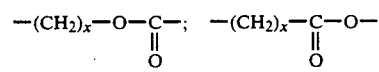

Examples of the nematic or smectic liquid crystalline group M shown in formula (1) are represented by the following formulae:

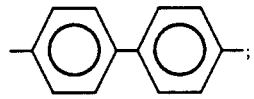

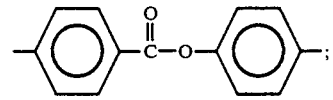

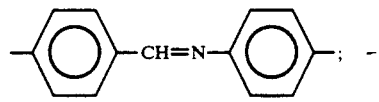

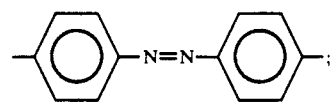

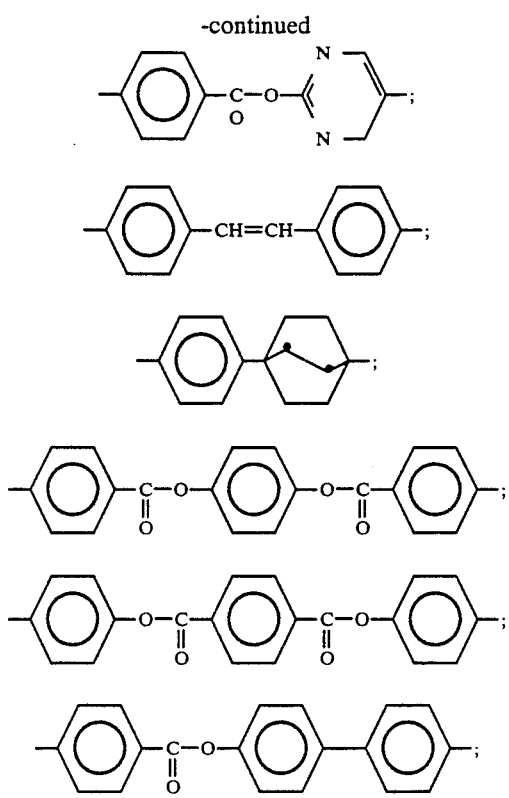

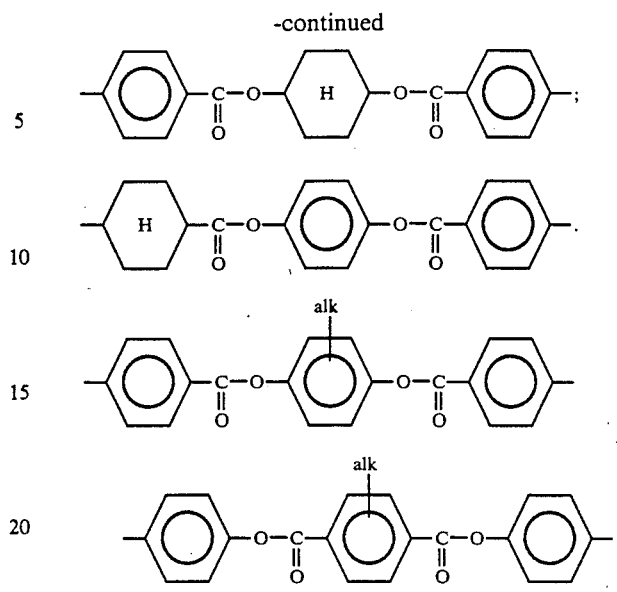

wherein alk represents an alkyl group having 1-6 carbon atoms.

In a favourable embodiment of the method according to the invention, a monomer is used which corresponds to formula (2)

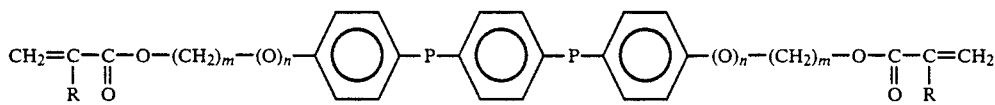

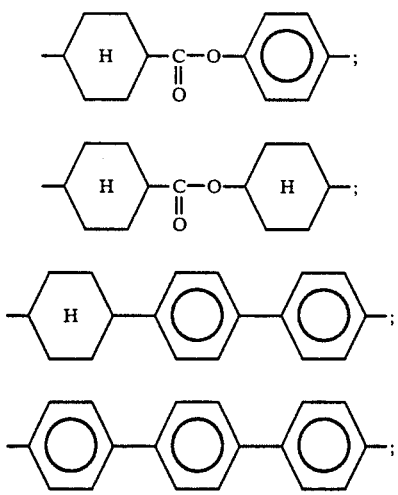

wherein
m is equal to 1–15
n is equal to 0 to 1
R is a hydrogen atom or a methyl group, and
P is the group

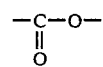

or the group

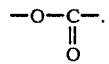

By virtue of the high mobility of the molecules and the character of the liquid crystalline group incorporated in said molecules, this monomer can be oriented very rapidly. The polymerisation of the monomer by exposing it to radiation using, for example, UV light is also carried out very rapidly.

Examples of effective monomers are represented by the following formulae:

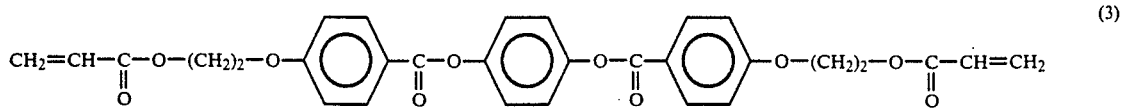

(3)

-continued

(4)

(5)

(6)

(7)

(8)

(9)

(10)

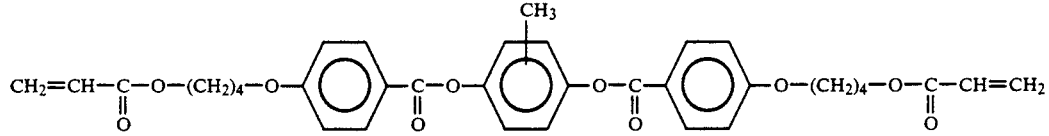
(11)

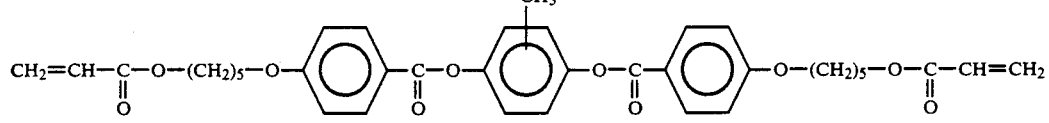
(12)

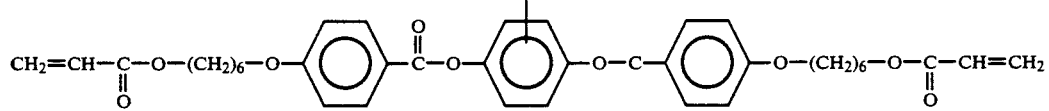
(13)

In a method according to the invention, the liquid crystalline monomer can be oriented in different manners. For example, the substrate surface on which the mixture of the liquid crystalline monomer and the dichroic colorant is provided can be rubbed in one direction, for example by using a velvet cloth. Consequently, the molecules and the liquid crystalline monomer compound are oriented in the direction of rubbing. In this case, the orientation of the molecules extends in a direction parallel to the substrate surface. As a result of the orientation of the monomer molecules, the molecules of the dichroic colorant will also be oriented in the same direction. This phenomenon is termed guest-host effect.

A suitable material which can be oriented by rubbing is polyimide. Thus, the substrate used in the method according to the invention can be manufactured from polyimide or covered with a layer of polyimide. In the latter case, for example, a glass plate may be used as a support for the polyimide.

In a preferred embodiment of the method according to the invention, the mixture of the liquid crystalline monomer and the dichroic colorant which is provided on the substrate is oriented under the influence of an external field of force, in particular a magnetic field or an electric field. This has several advantages. Firstly, there is freedom of choice of a substrate. Secondly, a very rapid orientation is possible. Thirdly, any direction of orientation can be attained by the selection of the field direction of the magnetic or electric field applied.

Obviously, orientation is possible only when the monomer is in the liquid crystalline phase. This is a matter of temperature. The layer composed of the mixture of the monomer and the dichroic colorant must be heated to a temperature which is higher than the transition temperature from crystalline to liquid crystalline and lower than the transition temperature from liquid crystalline to isotropic. Alternatively, the monomer may be processed, after it has been melted, in the undercooled phase at temperatures below the melting point.

After the monomer molecules and, hence, the colorant molecules are oriented, the monomer molecules are polymerized. Polymerization takes place by irradiation using light, in particular UV light. To this end, the monomer composition to be polymerized comprises a photoinitiator in a quantity from 0.5-5% by weight. Examples of suitable photoinitiators are represented by the formulae

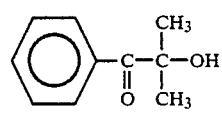
(14)

and

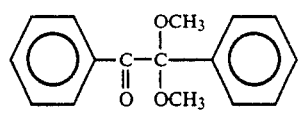
(15)

The concentration of the dichroic colorant in the mixture of the monomer and the colorant is not restricted within narrow limits. A suitable concentration ranges from 1-10% by weight and, typically, from 1-4% by weight. Examples of suitable dichroic colorants are represented by the following formulae:

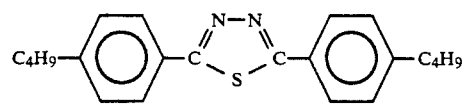
(16)

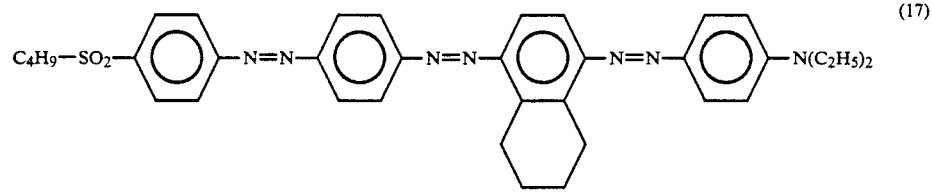
(17)

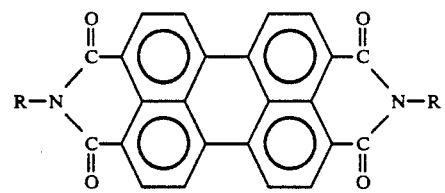
(18)

wherein R is an alkyl group having 1-10 carbon atoms.

The colorant represented by formula (16) is a UV-light absorbing colorant. It might be assumed that due to the presence of such a colorant, the monomer molecules cannot or only partly be polymerized by means of UV light. This assumption is incorrect. The colorant molecules are oriented, so that polymerisation of the monomer by UV light is very well possible since the film remains transparent to the common rays.

For examples of further dichroic colorants reference is made to Mol. Cryst. Liq. Cryst., 1979, Vol. 55, pp. 1-32.

The invention further relates to a novel polarization filter which is obtained by using the above-described method. Said polarization filter according to the invention is characterized in that it comprises a substrate which is provided on one side with a layer of an oriented and polymerized monomer which contains a dichroic colorant, said monomer corresponding to the formula

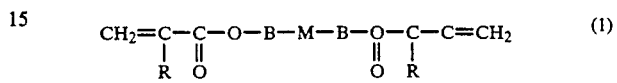
(1)

wherein
B is a bridging group,
R is a hydrogen atom or a methyl group, and
M is a mesogenic group comprising at least a phenyl group and/or a cyclohexyl group, so that the monomer as a whole acquires a nematic or smectic phase.

The invention also relates to a liquid crystalline display comprising two transparent wall portions which extend parallel to each other and which are interconnected along the periphery by means of a seal, each wall portion being provided with one or more transparent electrodes on the inside and the space bounded by the wall portions and the seal containing a liquid crystalline medium, characterized in that at least one of the two wall portions is also provided with a polarization filter on the inside, which filter contains a layer of an oriented and polymerised liquid crystalline monomer in which a dichroic colorant is incorporated, said monomer corresponding to the formula

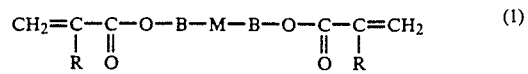
(1)

wherein
B is a bridging group,

R is a hydrogen atom or a methyl group, and

M is a mesogenic group which comprises at least a phenyl group and/or a cyclohexyl group, so that the monomer as a whole acquires a nematic or smectic phase.

The display according to the invention has the advantage that the above-defined filter is arranged on the inside of the wall portions of the display. This is possible because by virtue of the above-described network structure the filter is resistant to possible attack by the liquid crystalline medium present in the display. A polarisation filter which is arranged on the inside is totally screened from the surroundings and, hence, it is protected against possible atmospheric contaminations such as dust particles. A display having (a) polarization filter(s) arranged on the inside can also be manufactured in a simple manner.

EXEMPLARY EMBODIMENT

The invention will be explained in greater detail by means of the following exemplary embodiment and with reference to the accompanying drawing.

A substrate plate 1 of glass having a thickness of 0.5 mm is provided with a layer 2 of a mixture comprising 96% by weight of a liquid crystalline monomer compound of formula (5), 2.5% by weight of a dichroic colorant of formula (17) and 1-5% by weight of an initiator of formula (14). Said layer 2 is applied by means of spin coating and has a thickness of, for example, 10 μm. Layer 2 is heated to a temperature in excess of the transition temperature (107° C.) from the crystalline to the liquid crystalline (nematic) phase. A suitable temperature is 115° C. The temperature used must be lower than the transition temperature from the liquid crystalline to the isotropic phase, which in the present example is 165° C. The molecules of the liquid crystalline monomer compound and, hence, also the molecules of the dichroic colorant are oriented in a direction which extends parallel to the magnetic field direction by means of a magnetic field of 10 k. Gauss whose field direction is indicated by arrow 3. Said magnetic field direction is indicated by arrows 4. Subsequently, layer 2 is irradiated over its entire surface by means of UV, which UV light is generated by a low-pressure mercury vapour lamp having a power of 5 mW/cm$^2$. The exposure time is several minutes. During exposure the temperature is held at 115° C. and the magnetic field is also maintained. The oriented molecules of the liquid crystalline monomer compound are polymerized as a result of said exposure, so that the desired orientation is fixed. The orientation of the molecules of the dichroic colorant is also fixed as a result of the polymerisation of the liquid crystalline monomer molecules. A network of liquid crystalline polymer molecules is formed, such that the oriented colorant molecules are incorporated therein while preserving their direction of orientation. The polarization filter according to the invention, as shown in FIG. 1, is manufactured as described hereinbefore.

Instead of orienting the liquid crystalline monomer molecules by applying a magnetic field or an electric field, as described above, another method of obtaining the desired orientation can alternatively be used. For this purpose, a substrate is used whose surface, to which the liquid crystalline monomer is applied at a later stage, is rubbed in one direction with, for example, a velvet cloth. As a consequence hereof, the molecules of the substrate surface are oriented in the direction of rubbing.

The above mixture of the liquid crystalline monomer compound and the dichroic colorant is applied to the surface thus treated. The molecules of the monomer compound and the colorant are oriented in the initial direction of rubbing. A suitable substrate is manufactured from polyimide. The substrate may also comprise a support plate of, for example, glass or quartz on which a polyimide layer or possibly another synthetic resin layer may be oriented, for example, by rubbing. A suitable synthetic resin layer can be obtained by exposing a UV-light curable composition comprising 60 parts by weight of a compound of formula 19, 36 parts by weight of a compound of formula 20 and 4% by weight of an initiator to light, and hence polymerising it.

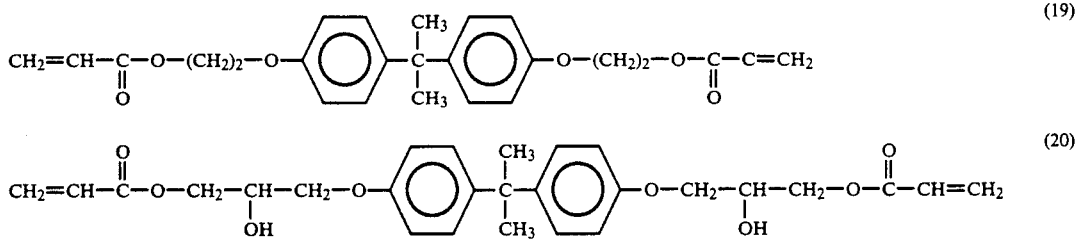

In layer 2 of the optical filter according to the invention, various dichroic colorants can be used. For example, three or more dichroic colorants can be used which each have a different absorption characteristic and, for example, which have an absorption wavelength area in respectively, the blue, red and green part, of the spectrum. By using such mixtures of dichroic colorants in the polarization filter according to the invention, white light can be completely or substantially polarised.

When the polarization filter is used, non-polarised light is irradiated in a direction perpendicular to the main faces of the filter. This direction is indicated by arrow 5. The polarisation component of said light, which components extends in a direction parallel to the direction of orientation (arrows 4) of the molecules of the dichroic colorant or colorants used is absorbed. The polarization component which extends perpendicularly to the direction of orientation is passed, so that polarised light having a predetermined direction of polarization is obtained.

Figure 2:
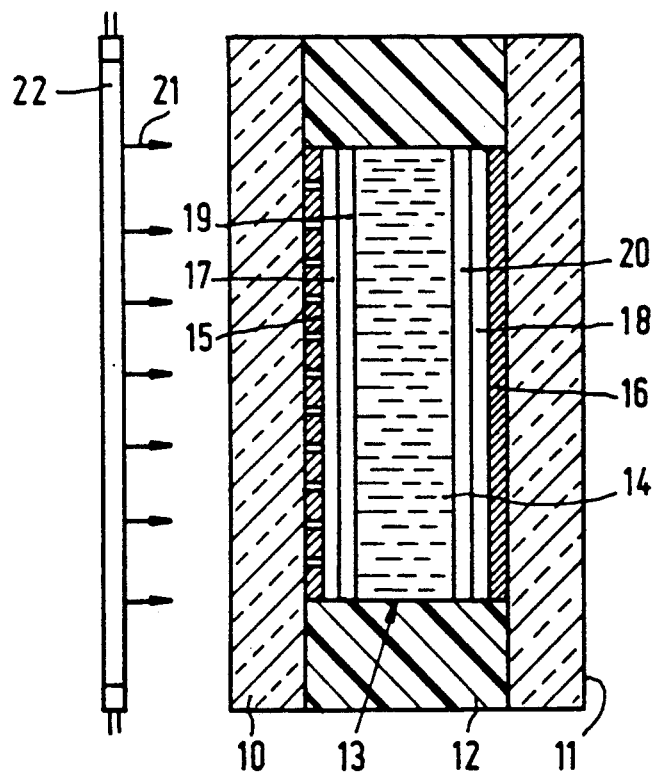
FIG. 2 is a cross-sectional view of a liquid crystalline display according to the invention which comprises polarization filters according to FIG. 1.

In FIG. 2, reference numerals 10 and 11 denote two parallel disposed glass plates. Said plates 10 and 11 are interconnected by a peripherally arranged sealing ring 12 which is composed of, for example, an adhesive or a synthetic resin ring which is bonded to said plates by means of an adhesive. A liquid crystalline cell medium 14 is present in a cellular space 13 which is enclosed by the plates 10, 11 and the ring 12, said cell medium containing 1% by weight of a chiral substance having the following formula

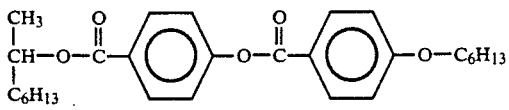

and for the rest a liquid crystalline material comprising one or more compounds of the following formulae:

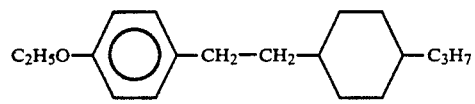

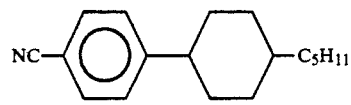

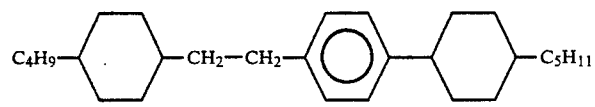

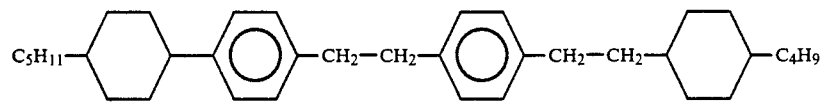

Such a material is marketed by Hoffman-la Roche under the tradename ROTN 3010.

At the surface facing the cell medium 14, the plates 10 and 11 have transparent strip-shaped electrodes 15 and 16 which cross each other at right angles and form a matrix of switching elements. The electrodes are manufactured from, for example, indium-tin oxide (ITO).

The above-described polarization filter, referenced 17 and 18, is provided on each of the electrodes 15 and 16, respectively. These filters may be completely identical with the filter shown in FIG. 1, i.e., each filter comprises a substrate plate 1 and a liquid crystalline layer 2 (FIG. 1). It is alternatively possible to use only the liquid crystalline layer 2 of the optical filter. In this case, plate 10 with electrode 15 serves as the substrate plate for the liquid crystalline layer. The same applies to plate 11 with electrode 16. It is alternatively possible to arrange the optical polarization filters 17 and 18 between the glass plates 10 and 11 and the electrodes 15 and 16, respectively. Finally, oxidation layers 19 and 20, which are manufactured from obliquely vapour-deposited SiO, are applied to the polarisation filters 17 and 18, respectively.

The liquid crystalline cell medium 14 has a 270° twist across the cell thickness. Twist is to be understood to mean herein the rotation of the average direction (director) of the longitudinal axis of the molecules of the liquid crystalline compound across the cell thickness, i.e. over the distance between the orientation layers 19 and 20.

The display according to FIG. 2 operates as follows.

The display is irradiated by non-polarized white light 21 which is emitted by a lamp 22. Said light 21 passes through the transparent (glass) plate 10, the transparent electrode 15 and subsequently the polarization filter 17. The light 11 is polarised when it passes through the polarization filter. The polarised light passes through the orientation layer 19 and reaches the liquid cell medium 14. The further propagation of the light through the cell medium 14 depends on the voltage pattern of the electrodes 15, 16. An electric voltage pattern which is representative of the image to be displayed is applied to said electrodes which, according to a customary construction, are built up of column electrodes 15 and row electrodes 16 which cross each other at right angles and which can individually be driven electrically. In those parts of the cell medium, located between the electrodes 15, 16, where no electric field prevails, i.e. no voltage at the relevant electrodes, or where a weak electric field prevails which is below a threshold value, the cell medium exhibits the 270° twisted configuration.

The molecules of the liquid crystalline cell medium 14 follow this twisted configuration. In this twisted configuration of 270° across the cell, the molecules of the liquid crystalline material have a tilted orientation at the interface of the medium 14 and the substrate wall, the tilt angle being approximately 20° relative to the surface of the substrate plate 10 or 11. Towards the centre of the cell the tilt angle of the molecules decreases to a few degrees. For the sake of convenience, said twisted configuration having a tilted orientation will hereinafter be referred to as the non-energised or voltageless situation.

At those areas of the cell medium 14 where an electric field is formed by applying an electric voltage in excess of the threshold value to the electrodes 15 and 16 located on either side, the molecules of the cell medium 14 will be oriented according to the field lines and exhibit an orientation which extends perpendicularly or substantially perpendicularly to the electrodes 15, 16 and, hence, to the substrate plates 10, 11. This perpendicular orientation will hereinafter be referred to as the voltage-conveying or energised situation.

When the above-mentioned polarized light 11 passes through the part of the cell medium 14 which is non-energised, the linearly polarised light is changed into elliptically polarised light as a result of birefringence. This change depends on the wavelength. Subsequently, the light passes through the orientation layer 20, the polarisation filter 18, the electrodes 16 and the plate 11. The colour of said light depends on the position of the polarisation filter 18 (analyser) relative to the polarization filter 17. In the case of a parallel position a blue colour effect is obtained, i.e. blue light.

When the polarized light 11 passes through the part of the cell medium which is energized, said light is passed substantially unchanged as a result of the optically isotropic situation. Consequently, when the polarization filters 17 and 18 extend parallel to each other white light is passed and, hence, a blue-white image is obtained.

When the polarisers 17 and 18 are arranged so that they cross each other, the elliptically polarized light has a yellow colour effect in the non-energized situation. In the energised situation no light is passed as a result of the crossed position of the polarisers 17, 18. The result is an image having a yellow-black contrast.

We claim:

1. A method of manufacturing a polarization filter, in which a mixture of a liquid crystalline monomer and a dichroic colorant is oriented on a substrate, and the monomer is polymerized by exposing it to uniform radiation, characterized in that a monomer is used which corresponds to the formula $$CH_2=C-C-O-B-M-B-O-C-C=CH_2 \quad (1)$$
$$\phantom{CH_2=}|\phantom{-}\|\phantom{-O-B-M-B-O-}\|\phantom{-}|$$
$$\phantom{CH_2=}R\phantom{-}O\phantom{-O-B-M-B-O-}O\phantom{-}R$$

wherein
B is a bridging group,
R is a hydrogen atom or a methyl group, and
M is a mesogenic group comprising at least a phenyl group and/or a cyclohexyl group, so that the monomer as a whole acquires a nematic or smectic phase.

2. A method as claimed in claim 1, characterized in that a monomer is used which corresponds to the formula $$CH_2=C-C-O-(CH_2)_m-(O)_n-\text{\textbenzene}-P- \quad (2)$$

-continued $$-\text{\textbenzene}-P-\text{\textbenzene}-(O)_n-(CH_2)_m-O-C-C=CH_2$$
$$\phantom{-\text{\textbenzene}-P-\text{\textbenzene}-(O)_n-(CH_2)_m-O-}\|\phantom{-}|$$
$$\phantom{-\text{\textbenzene}-P-\text{\textbenzene}-(O)_n-(CH_2)_m-O-}O\phantom{-}R$$

wherein
m is equal to 1-15,
n is equal to 0 to 1,
R is a hydrogen atom or a methyl group, and
P is the group $$-C-O-$$
$$\|$$
$$O$$

or the group $$-O-C-$$
$$\phantom{-O-}\|$$
$$\phantom{-O-}O$$

3. A method as claimed in claim 2, characterized in that the mixture of the liquid crystalline monomer and a dichroic colorant applied to the substrate is directed (oriented) under the influence of an external field of force, in particular a magnetic field or an electric field.

4. A method as claimed in claim 1, characterized in that the mixture of the liquid crystalline monomer and a dichroic colorant applied to the substrate is directed (oriented) under the influence of an external field of force, in particular a magnetic field or an electric field.

5. A polarization filter obtained by using the method as claimed in claim 1, characterized in that the filter comprises a substrate which is provided on one side with a layer of an oriented and polymerized monomer in which a dichroic colorant is incorporated, said monomer corresponding to the formula $$CH_2=C-C-O-B-M-B-O-C-C=CH_2 \quad (1)$$
$$\phantom{CH_2=}|\phantom{-}\|\phantom{-O-B-M-B-O-}\|\phantom{-}|$$
$$\phantom{CH_2=}R\phantom{-}O\phantom{-O-B-M-B-O-}O\phantom{-}R$$

wherein
B is a bridging group,
R is a hydrogen atom or a methyl group, and
M is a mesogenic group comprising at least a phenyl group and/or a cyclohexyl group, so that the monomer as a whole acquires a nematic or smectic phase.

* * * * *